(12) United States Patent
Wang

(10) Patent No.: US 8,425,103 B2
(45) Date of Patent: Apr. 23, 2013

(54) BACKLIGHT MODULE HAVING A LIGHT GUIDE PLATE WITH PRISMATIC STRUCTURES AND MANUFACTURING METHOD THEREOF

(75) Inventor: Chiung-Han Wang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 411 days.

(21) Appl. No.: 12/776,524

(22) Filed: May 10, 2010

(65) Prior Publication Data
US 2011/0128757 A1 Jun. 2, 2011

(30) Foreign Application Priority Data

Nov. 27, 2009 (TW) ................. 98140683 A

(51) Int. Cl.
*F21V 7/04* (2006.01)
*B23P 17/04* (2006.01)
(52) U.S. Cl.
USPC .......................................... 362/613; 362/620
(58) Field of Classification Search .......... 362/600–632, 362/97.1–97.3
See application file for complete search history.

(56) References Cited

U.S. PATENT DOCUMENTS 5,719,649 A * 2/1998 Shono et al. .................... 349/65
2010/0073913 A1 3/2010 Yeh

FOREIGN PATENT DOCUMENTS

CN 201007769 Y 1/2008
CN 201007769 Y * 1/2008

OTHER PUBLICATIONS

English language translation of abstract of TW 314346.
English translation of abstract of CN 201007769 Y.
China Office Action dated Jan. 26, 2011.

* cited by examiner

*Primary Examiner* — Anh Mai
*Assistant Examiner* — Elmito Breval
(74) *Attorney, Agent, or Firm* — McClure, Qualey & Rodack, LLP

(57) ABSTRACT

A backlight module having a light guide plate with prismatic structures and a manufacturing method thereof are provided. The backlight module includes a light guide plate, a brightness enhancement film, and a light source module. The light guide plate includes a first surface and a second surface opposite to each other. The first surface has prismatic structures disposed side by side thereon. Each of the prismatic structures includes a first slope and a second slope being adjacent to each other and having an included angle with respect to the first surface, respectively. The included angles are equivalent. The brightness enhancement film includes a third surface and a fourth surface opposite to each other. The third surface faces the second surface. The fourth surface has prisms disposed side by side thereon along the extending direction of the prismatic structure. The brightness enhancement film has an optimum incident angle associated with an angle of the prism and corresponding to the included angles. The light source module is disposed beside the light guide plate along the extending direction of the prismatic structure.

29 Claims, 7 Drawing Sheets

BACKLIGHT MODULE HAVING A LIGHT GUIDE PLATE WITH PRISMATIC STRUCTURES AND MANUFACTURING METHOD THEREOF

This application claims priority based on a Taiwanese Patent Application No. 098140683, filed on Nov. 27, 2009, the disclosure of which is incorporated herein by reference in its entirety.

BACKGROUND OF THE INVENTION

1. Field of the Invention

The present invention relates to a backlight module and a manufacturing method thereof; particularly, the present invention relates to a backlight module employing a light guide plate with prismatic structures and a manufacturing method thereof.

2. Description of the Related Art

In comparison with conventional CRT (cathode ray tube) display, LCD (liquid crystal display) has the advantages of thin thickness, light weight, low radiation, etc. As a result, LCDs substitute conventional CRT displays gradually and become a mainstream display device nowadays. Since liquid crystal is not luminous, the backlight module is employed as the light source and consequently becomes an essential component for LCD panel to display images. Hence, as to the development of LCD, in addition to the objective of thin thickness in appearance, enhanced brightness of LCD panel is also an objective in the design of the backlight module.

To enhance light utilization efficiency is a way to improve the brightness of LCD panel. Light guide plate (LGP) is one of major components of the backlight module which directs light beams so as to enhance and to even the brightness of LCD panel.

Printed light guide plate is generally employed in present design of light guide plate. However, restricted by the physical characteristic of printed light guide plat, the objective of high brightness is hard to be achieved while printed light guide plat is employed. Therefore, in order to increase the brightness of LCD, how to enhance the light utilization efficiency by improving the design of light guide plate is an important issue.

SUMMARY OF THE INVENTION

It is an objective of the present invention to provide a backlight module having a light guide plate with prismatic structures and a manufacturing method thereof, which employs micro structures on the light guide plate to improve the optical property of the light guide plate, so that the light beam exiting the light guide plate enters the brightness enhancement film at the optimum incident angle of the brightness enhancement film. As a result, the light utilization efficiency of light guide plate can be enhanced to increase the brightness of LCD panel, so that the problems in prior arts can be improved. Besides, since there will be no difference in brightness between the left side and the right side of the display device when employing the backlight module of the present invention, the TCO 03 standards for display devices can be satisfied.

The backlight module includes a light guide plate, a brightness enhancement film, and a light source module. The light guide plate includes a first surface and a second surface opposite to each other. The first surface has prismatic structures disposed side by side thereon. Each of the prismatic structures includes a first slope and a second slope being adjacent to each other and each having an included angle with respect to the first surface. The included angles can be equivalent. The brightness enhancement film includes a third surface and a fourth surface opposite to each other. The third surface faces the second surface. The fourth surface has prisms disposed side by side thereon along the extending direction of the prismatic structure. The brightness enhancement film has an optimum incident angle associated with an angle of the prism and corresponding to the included angle. The light source module is disposed beside the light guide plate along the extending direction of the prismatic structure.

DETAILED DESCRIPTION OF THE PREFERRED EMBODIMENT

The present invention provides a backlight module and a manufacturing method thereof. In a preferred embodiment, the backlight module is applied to a flat panel display. However, in other embodiments, the backlight module can be applied to the keyboard of computers, the keypad of mobile phones, billboards, or other devices in need of flat panel light source.

Figure 1A:
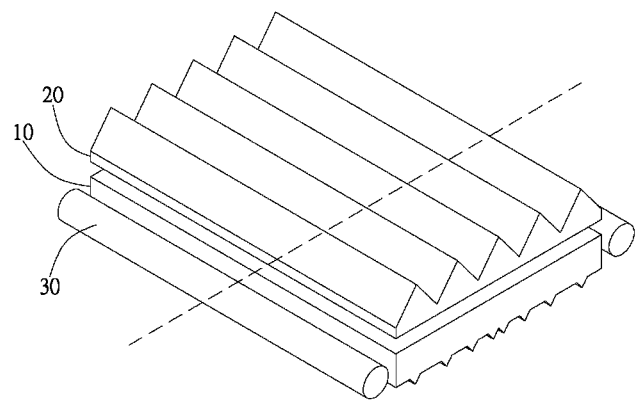
FIG. 1A is a schematic view of an embodiment of the backlight module of the present invention.
Figure 1B:
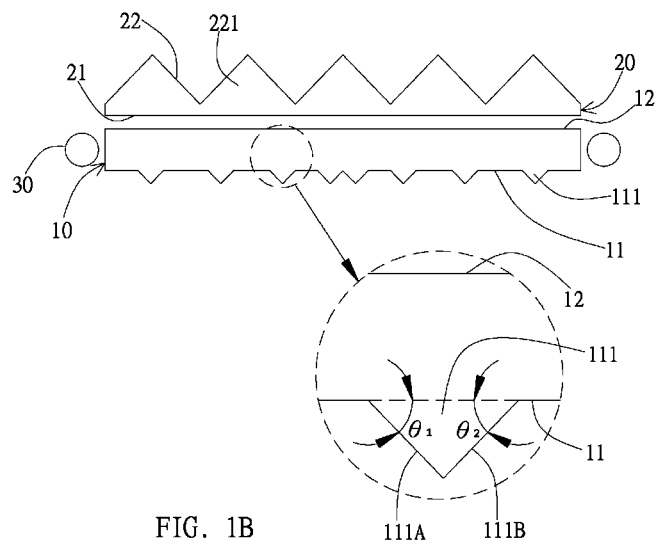
FIG. 1B is a cross-sectional view of the backlight module shown in FIG. 1A.

FIG. 1A is a schematic view of an embodiment of the backlight module of the present invention. As shown in FIG. 1A, the backlight module includes a light guide plate 10, a brightness enhancement film 20, and light source modules 30. The brightness enhancement film 20 is disposed upon the light guide plate 10 while the light source module 30 is disposed beside the light guide plate 10. FIG. 1B is a cross-sectional view of the backlight module shown in FIG. 1A. As shown in FIG. 1B, the light guide plate 10 includes a first surface 11 and a second surface 12 opposite to each other. The first surface 11 and the second surface 12 are the lower surface and the upper surface of the light guide plate 10, respectively. The first surface 11 has a plurality of prismatic structures 111 disposed side by side and parallel to each other. As shown in FIG. 1A, each of the prismatic structures 111 forms a ridge on the first surface 11. As shown in FIG. 1B, each of the prismatic structures 111 has a triangular cross section, so that a first slope 111A and a second slope 111B adjacent to each other are formed on the first surface 11. The second surface 12 is parallel to the surface where the prismatic structures 111 are located. The first slope 111A and the second slope 111B have a first included angle $\theta_1$ and a second included angle $\theta_2$ with respect to the first surface 11, respectively. The first included angle $\theta_1$ and the second included angle $\theta_2$ are equivalent, hence the cross section of the prismatic structures 111 forms an isosceles triangle. In other words, each of the prismatic structures 111 has a triangular cross section with two symmetric sides.

Figure 1C:
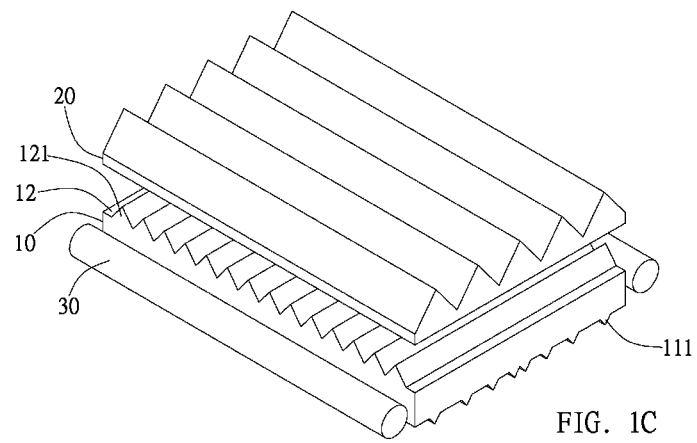
FIG. 1C is a schematic view of another embodiment of the light guide plate of the backlight module of the present invention.

In this embodiment, as shown in FIG. 1B, the disposing density of the prismatic structures 111 can be optionally varied across the first surface 11. For instance, the disposing density near the light source can be sparser than that far from the light source so as to achieve a uniform light distribution. However, in other embodiments, the prismatic structures can be equidistantly disposed, and their size can be different. Furthermore, in this embodiment, the second surface 12 is a smooth plane. However, in other embodiments, as shown in FIG. 1C, a plurality of optical structures 121 can be disposed on the second surface 12 in a side-by-side manner, so that the extending direction of the optical structures 121 and that of the prismatic structures 111 are perpendicular to each other. In a preferred embodiment, the light guide plate can be a flat plate or a wedge-shaped plate.

As shown in FIG. 1B, the brightness enhancement film 20 having a third surface 21 and a fourth surface 22 opposite to each other is disposed on the light guide plate 10 and parallel thereto. The third surface 21 faces the second surface 12 of the light guide plate 10. The fourth surface 22 has a plurality of prisms 221 disposed thereon in a side-by-side manner, wherein the prisms 221 are parallel to each other. The prisms 221 and the prismatic structures 111 preferably have a same extending direction. In other words, the prisms 221 and the prismatic structures 111 are preferably parallel to each other.

As shown in FIG. 1B, the light source modules 30 are disposed beside the light guide plate 10 and parallel to the prismatic structures 111 and the prisms 221. In this embodiment, there are two light source modules 30 disposed on two sides of the light guide plate 10, respectively. However, in other embodiments, there can be merely one light source module 30 disposed on one side of the light guide plate 10. After exiting from the second surface 12 of the light guide plate 10, the light beam produced by the light source module 30 enters the third surface 21 of the brightness enhancement film 20, wherein the emergent angle of the light beam from the second surface 12 is controlled by the prismatic structure 111.

Figure 1D:
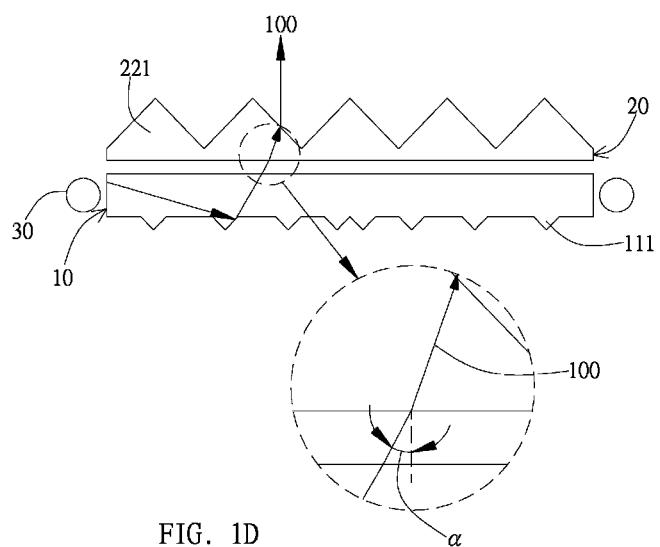
FIG. 1D is a schematic view of the optical behavior of the backlight module shown in FIG. 1B.

FIG. 1D is a schematic view of the optical behavior of the backlight module shown in FIG. 1B. As shown in FIG. 1D, the brightness enhancement film 20 has an optimum incident angle $\alpha$. After entering the light guide plate 10, the light beam from the light source module 30 is reflected by the prismatic structure 111 and then exits the light guide plate 10. The emergent angle of the light beam 100 from the second surface 12 can be controlled by modifying the design of the prismatic structure 111, so that the light beam 100 enters the brightness enhancement film 20 at the optimum incident angle $\alpha$. The light beam 100 entering at the optimum incident angle $\alpha$ will exit the brightness enhancement film 20 with higher energy. As a result, the light utilization efficiency is enhanced, and then the brightness of LCD panel can be increased. In other words, when lights with the same energy enter the brightness enhancement film 20 at different angles, the light entering the brightness enhancement film 20 at the optimum incident angle $\alpha$ will exit the brightness enhancement film 20 with the highest energy. The optimum incident angle $\alpha$ is associated with the refractive index of the brightness enhancement film 20 and varies in accordance with the angle of the prism 221. The optimum incident angle $\alpha$ varies with the material employed by the brightness enhancement film 20 and is preferably between 25 degrees and 35 degrees. For instance, the optimum incident angle $\alpha$ is about 25 degrees while the refractive index is 1.48; the optimum incident angle $\alpha$ is about 30 degrees while the refractive index is 1.58; the optimum incident angle $\alpha$ is about 35 degrees while the refractive index is 1.68. In a preferred embodiment, the brightness enhancement film 20 is made of PET (polyethylene terephthalate) or other materials having a refractive index of about 1.5, and the optimum incident angle is therefore slightly larger than 25 degrees.

The first included angle $\theta_1$ and the second included angle $\theta_2$ are selected from an angular range R preferably between 14 degrees and 34 degrees. When the optimum incident angle $\alpha$ is increased, an lower limit and a upper limit of the angular range R is decreased correspondingly. On the contrary, when the optimum incident angle $\alpha$ is decreased, the lower limit and the upper limit of the angular range R is increased correspondingly. In this embodiment, a decrease magnitude of the lower limit of the angular range R is larger than that of the upper limit of the angular range R under a same increase magnitude of the optimum incident angle $\alpha$. In other words, the decreasing rate of the lower limit of the angular range R is larger than that of the upper limit of the angular range R under a same increasing rate of the optimum incident angle $\alpha$. Besides, when the optimum incident angle $\alpha$ is increased, the angular range R is also increased. On the contrary, when the optimum incident angle $\alpha$ is decreased, the angular range R is also decreased.

In this embodiment, the angular range R for the first included angle $\theta_1$ and the second included angle $\theta_2$ is between 19 degrees and 33 degrees while the optimum incident angle $\alpha$ is 30 degrees. However, in other embodiments, when the optimum incident angle $\alpha$ is other than 30 degrees, the lower limit and the upper limit of the angular range R can be increased or decreased correspondingly. For instance, when the optimum incident angle $\alpha$ is decreased to 25 degrees, the lower limit and the upper limit of the angular range R is therefore increased to 22 degrees and 34 degrees, respectively. On the contrary, when the optimum incident angle $\alpha$ is increased to 35 degrees, the lower limit and the upper limit of the angular range R is therefore decreased to 14 degrees and 32 degrees, respectively.

Furthermore, the backlight module of the present invention enhances the brightness of LCD panel by directing light beam rather than by narrowing the viewing angle in conventional backlight modules, so that the light beam enters the brightness enhancement film at an optimum incident angle and then consequently exits the brightness enhancement film with higher energy. Hence, there will be no difference in brightness between the left side of the display device and the right side of the display device, and the TCO 03 standards for display devices can therefore be satisfied.

Figure 2:
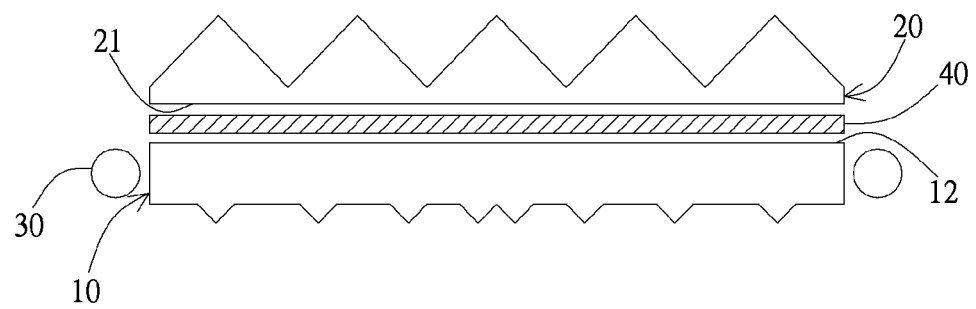
FIG. 2 is a cross-sectional view of the backlight module shown in FIG. 1B with additional lower diffuser.

Besides the light guide plate, the brightness enhancement film, and the light source module, the backlight module of the present invention can optionally have a diffuser disposed between the light guide plate and the brightness enhancement film. FIG. 2 is a cross-sectional view of the backlight module shown in FIG. 1B with additional lower diffuser. As shown in FIG. 2, a lower diffuser 40 is sandwiched between the second surface 12 of the light guide plate 10 and the third surface 21 of the brightness enhancement film 20. In this embodiment, the haze of the lower diffuser 40 is between 30% and 99.9%. However, in other embodiments, the haze of the lower diffuser can have a different range.

Figure 3:
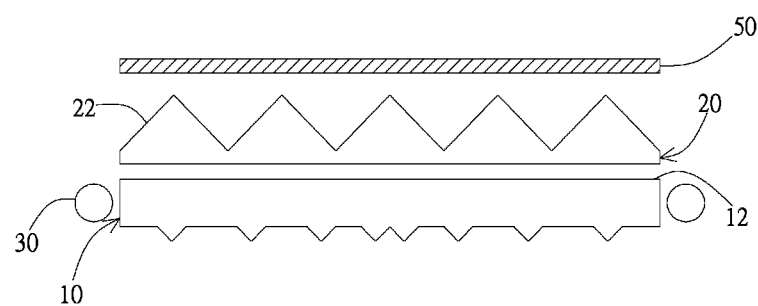
FIG. 3 is a cross-sectional view of the backlight module shown in FIG. 1B with additional upper diffuser.
Figure 4:
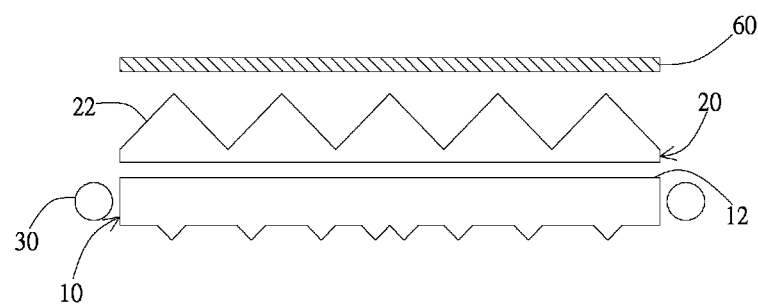
FIG. 4 is a cross-sectional view of the backlight module shown in FIG. 1B with additional dual brightness enhancement film-diffuse.
Figure 5:
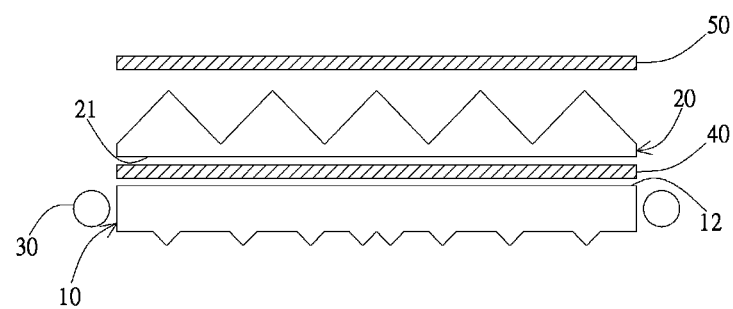
FIG. 5 is a cross-sectional view of the backlight module shown in FIG. 1B with additional lower diffuser and upper diffuser.
Figure 6:
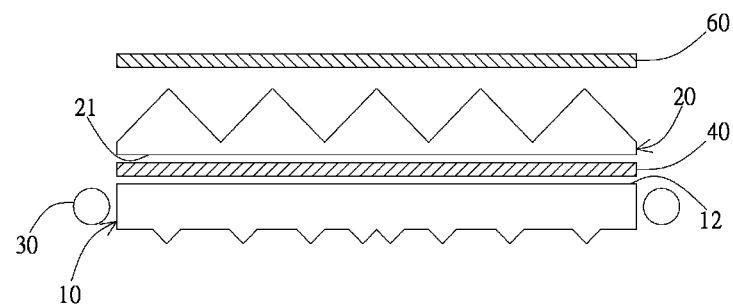
FIG. 6 is a cross-sectional view of the backlight module shown in FIG. 1B with additional lower diffuser and dual brightness enhancement film-diffuse.

In addition, a diffuser or a dual brightness enhancement film-diffuse (DBEF-D) can optionally be disposed on the brightness enhancement film. FIG. 3 is a cross-sectional view of the backlight module shown in FIG. 1B with additional upper diffuser. As shown in FIG. 3, the upper diffuser 50 is disposed on the brightness enhancement film 20 so that one surface of the upper diffuser 50 faces the fourth surface 22 of the brightness enhancement film 20. FIG. 4 is a cross-sectional view of the backlight module shown in FIG. 1B with additional dual brightness enhancement film-diffuse. As shown in FIG. 4, the dual brightness enhancement film-diffuse 60 is disposed on the brightness enhancement film 20 so that one surface of the dual brightness enhancement film-diffuse 60 faces the fourth surface 22 of the brightness enhancement film 20. Furthermore, as shown in FIG. 5, the lower diffuser 40 can be disposed between the light guide plate 10 and the brightness enhancement film 20 while the upper diffuser 50 is disposed upon the brightness enhancement film 20. Alternatively, as shown in FIG. 6, the lower diffuser 40 can be disposed between the light guide plate 10 and the brightness enhancement film 20 while the dual brightness enhancement film-diffuse 60 is disposed upon the brightness enhancement film 20.

Figure 7:
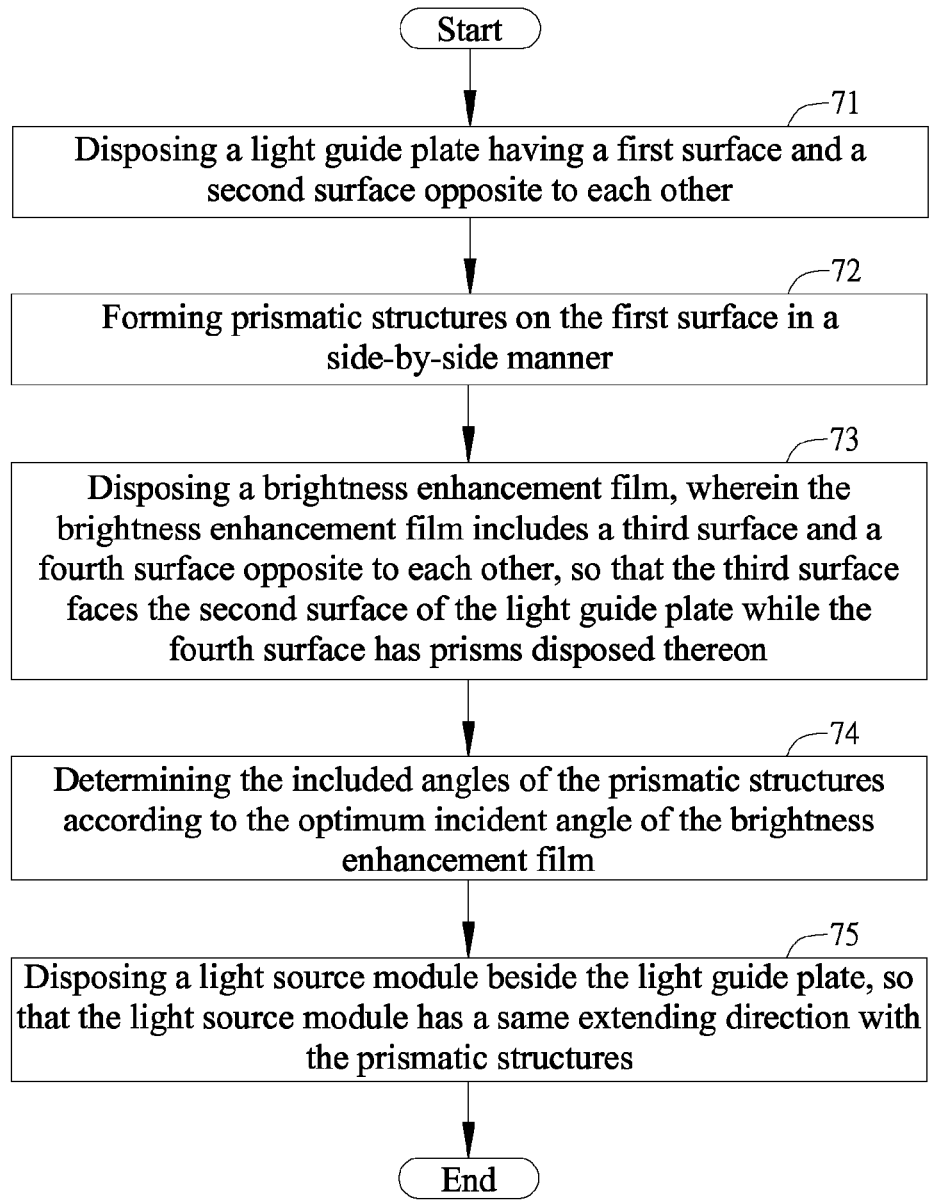
FIG. 7 is a flow chart of an exemplary method of manufacturing the backlight module of the present invention.

FIG. 7 is a flow chart of an exemplary method of manufacturing the backlight module of the present invention. As shown in FIG. 7, Step 71 includes disposing a light guide plate having a first surface and a second surface opposite to each other. Step 72 includes forming a plurality of prismatic structures on the first surface in a side-by-side manner, so that the prismatic structures are parallel to each other. Each of the prismatic structures includes a first slope and a second slope each having an included angle with respect to the surface where the prismatic structures are disposed. The included angle of the first slope and that of the second slope are equivalent. In a preferred embodiment, the light guide plate is a flat plate or a wedge-shaped plate. Besides, in other embodiments, a plurality of optical structures can be formed on the second surface of the light guide plate in a side-by-side manner, so that the extending direction of the optical structure and that of the prismatic structures are perpendicular to each other.

Step 73 includes disposing a brightness enhancement film. The brightness enhancement film includes a third surface and a fourth surface opposite to each other, so that the third surface faces the second surface of the light guide plate while the fourth surface has a plurality of prisms disposed parallel to each other along the extending direction of the prismatic structure. The brightness enhancement film has an optimum incident angle in a range between 25 degrees and 35 degrees. The optimum incident angle is associated with the refractive index of the brightness enhancement film and varies in accordance with the angle of the prisms.

Step 74 includes determining the included angles of the prismatic structures according to the optimum incident angle of the brightness enhancement film. The light beam entering the brightness enhancement film at the optimum incident angle will exit the brightness enhancement with higher energy, and the brightness of LCD panel can therefore enhanced. The included angles are selected from an angular range preferably between 14 degrees and 34 degrees. When the optimum incident angle is increased, an lower limit and a upper limit of the angular range are decreased correspondingly. On the contrary, when the optimum incident angle is decreased, the lower limit and the upper limit of the angular range are increased correspondingly. In this embodiment, a decrease magnitude of the lower limit of the angular range is larger than that of the upper limit of the angular range under a same increase magnitude of the optimum incident angle. Besides, when the optimum incident angle is increased, the angular range is also increased. On the contrary, when the optimum incident angle is decreased, the angular range is also decreased.

In this embodiment, the two included angles of the first slope and the second slope with respect to the surface where the prismatic structures is disposed is between 19 degrees and 33 degrees while the optimum incident angle is 30 degrees. However, in other embodiments, when the optimum incident angle is other than 30 degrees, the lower limit and the upper limit of the angular range can be increased or decreased correspondingly. For instance, when the optimum incident angle is decreased to 25 degrees, the lower limit and the upper limit of the angular range is therefore increased to 22 degrees and 34 degrees, respectively. On the contrary, when the optimum incident angle is increased to 35 degrees, the lower limit and the upper limit of the angular range is therefore decreased to 14 degrees and 32 degrees, respectively.

Step 75 includes disposing a light source module beside the light guide plate, so that the light source module has a same extending direction with the prismatic structures. In this embodiment, there are two light source modules disposed on two sides of the light guide plate, respectively. However, in other embodiments, there can be merely one light source module disposed on one side of the light guide plate.

Figure 8:
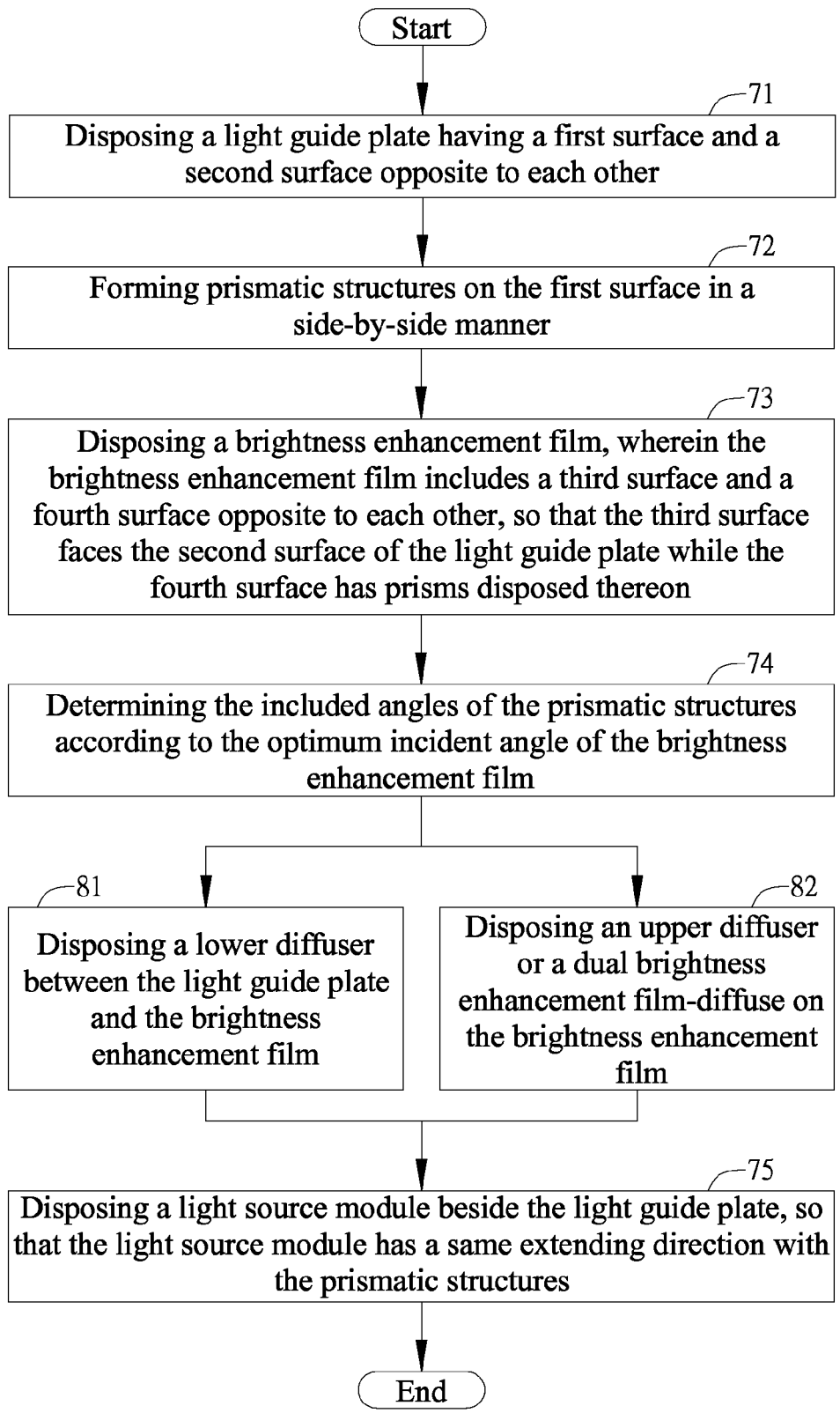
FIG. 8 is a flow chart of another exemplary method of manufacturing the backlight module of the present invention.

FIG. 8 is a flow chart of another exemplary method of manufacturing the backlight module of the present invention. As shown in FIG. 8, besides the steps 71, 72, 73, 74, and 75 shown in the exemplary method of FIG. 7, this embodiment further includes Step 81 and Step 82. Step 81 includes disposing a lower diffuser between the light guide plate and the brightness enhancement film, so that two surfaces of the lower diffuser face the second surface of the light guide plate and the third surface of the brightness enhancement film, respectively. In a preferred embodiment, the haze of the lower diffuser is between 30% and 99.9%. Step 82 includes disposing an upper diffuser or a dual brightness enhancement film-diffuse on the brightness enhancement film, so that one surface of the upper diffuser or the dual brightness enhancement film-diffuse faces the fourth surface of the brightness enhancement film.

Although the present invention has been described through the above-mentioned related embodiments, the above-mentioned embodiments are merely the examples for practicing the present invention. What need to be indicated is that the disclosed embodiments are not intended to limit the scope of the present invention. On the contrary, the modifications within the essence and the scope of the claims and their equivalent dispositions are all contained in the scope of the present invention.

What is claimed is:

1. A backlight module for a flat panel display, comprising:
a light guide plate including a first surface and a second surface opposite to each other, wherein the first surface has a plurality of prismatic structures disposed side by side thereon, each of the prismatic structures includes a first slope and a second slope being adjacent to each other and each having an included angle with respect to the first surface, the included angle of the first slope and that of the second slope are substantially equivalent, the included angles are selected from an angular range substantially between 14 degrees and 34 degrees;

a brightness enhancement film including a third surface and a fourth surface opposite to each other, wherein the third surface faces the second surface of the light guide plate, the fourth surface has a plurality of prisms disposed side by side thereon along the extending direction of the prismatic structure, the brightness enhancement film has an optimum incident angle associated with an angle of the prism, wherein the optimum incident angle is in a range substantially between 25 degrees and 35 degrees, the light entering the brightness enhancement film at the optimum incident angle will exit the brightness enhancement film with the highest energy; and at least a light source module disposed beside the light guide plate along the extending direction of the prismatic structure.

2. The backlight module of claim 1, wherein the light guide plate is a flat plate or a wedge-shaped plate.

3. The backlight module of claim 1, wherein a plurality of optical structures are formed on the second surface of the light guide plate in a side-by-side manner, the optical structures are disposed perpendicular to the extending direction of the prismatic structure.

4. The backlight module of claim 1, wherein when the optimum incident angle is increased, an upper limit and a lower limit of the angular range is decreased correspondingly, when the optimum incident angle is decreased, the lower limit and the upper limit of the angular range is increased correspondingly.

5. The backlight module of claim 1, wherein a decrease magnitude of the lower limit of the angular range is larger than that of an upper limit of the angular range under a same increase magnitude of the optimum incident angle.

6. The backlight module of claim 1, wherein when the optimum incident angle is increased, the angular range is increased, when the optimum incident angle is decreased, the angular range is decreased.

7. The backlight module of claim 1, wherein when the optimum incident angle is substantially equal to 25 degrees, the angular range is substantially between 22 degrees and 34 degrees.

8. The backlight module of claim 1, wherein when the optimum incident angle is substantially equal to 30 degrees, the angular range is substantially between 19 degrees and 33 degrees.

9. The backlight module of claim 1, wherein when the optimum incident angle is substantially equal to 35 degrees, the angular range is substantially between 14 degrees and 32 degrees.

10. The backlight module of claim 1, wherein the light source module includes a first light source and a second light source disposed on two sides of the light guide plate, respectively.

11. The backlight module of claim 1, further comprising a lower diffuser disposed between the light guide plate and the brightness enhancement film, wherein two surfaces of the lower diffuser face the second surface of the light guide plate and the third surface of the brightness enhancement film, respectively.

12. The backlight module of claim 11, wherein a haze of the lower diffuser is substantially between 30% and 99.9%.

13. The backlight module of claim 1, further comprising an upper diffuser disposed on the brightness enhancement film, wherein one surface of the upper diffuser faces the fourth surface of the brightness enhancement film.

14. The backlight module of claim 1, further comprising a dual brightness enhancement film-diffuse (DBEF-D) disposed on the brightness enhancement film, wherein one surface of the dual brightness enhancement film-diffuse faces the fourth surface of the brightness enhancement film.

15. The backlight module of claim 1, wherein after exiting from the second surface of the light guide plate, the light beam produced by the light source module enters the brightness enhancement film through the third surface of the brightness enhancement film.

16. A method for manufacturing a backlight module, comprising:
   disposing a light guide plate, wherein the light guide plate includes a first surface and a second surface opposite to each other;
   forming a plurality of prismatic structures on the first surface in a side-by-side manner, wherein each of the prismatic structures includes a first slope and a second slope each having an included angle with respect to the surface with the prismatic structures, the included angle of the first slope and that of the second slope are substantially equivalent;
   disposing a brightness enhancement film, wherein the brightness enhancement film includes a third surface and a fourth surface opposite to each other, the third surface faces the second surface of the light guide plate, the fourth surface has a plurality of prisms disposed side by side thereon along the extending direction of the prismatic structure, the brightness enhancement film has an optimum incident angle associated with an angle of the prism, wherein the optimum incident angle is in a range substantially between 25 degrees and 35 degrees, the light entering the brightness enhancement film at the optimum incident angle will exit the brightness enhancement film with the highest energy;
   determining the included angles according to the optimum incident angle, wherein the included angles are selected from an angular range substantially between 14 degrees and 34 degrees; and
   disposing at least a light source module beside the light guide plate, so that the light source module has a same extending direction with the prismatic structure.

17. The method of claim 16, wherein the light guide plate is a flat plate or a wedge-shaped plate.

18. The method of claim 16, further comprising forming a plurality of optical structures on the second surface of the light guide plate in a side-by-side manner, so that the optical structures are disposed perpendicular to the extending direction of the prismatic structure.

19. The method of claim 16, wherein in the step of determining the included angles, when the optimum incident angle is increased, an lower limit and a upper limit of the angular range is decreased correspondingly, when the angle of the optimum incident angle is decreased, the lower limit and the upper limit of the angular range is increased correspondingly.

20. The method of claim 16, wherein a decrease magnitude of the lower limit of the angular range is larger than that of an upper limit of the angular range under a same increase magnitude of the optimum incident angle.

21. The method of claim 16, wherein in the step of determining the included angles, when the optimum incident angle is increased, the angular range is increased, when the optimum incident angle is decreased, the angular range is decreased.

22. The method of claim 16, wherein in the step of determining the included angles, when the optimum incident angle is substantially equal to 25 degrees, the angular range is substantially between 22 degrees and 34 degrees.

23. The method of claim 16, wherein in the step of determining the included angles, when the optimum incident angle is substantially equal to 30 degrees, the angular range is substantially between 19 degrees and 33 degrees.

24. The method of claim 16, wherein in the step of determining the included angles, when the optimum incident angle is substantially equal to 35 degrees, the angular range is substantially between 14 degrees and 32 degrees.

25. The method of claim 16, wherein the step of disposing the light source module includes disposing a first light source and a second light source on two sides of the light guide plate, respectively.

26. The method of claim 16, further comprising disposing a lower diffuser between the light guide plate and the brightness enhancement film, so that two surfaces of the lower diffuser face the second surface of the light guide plate and the third surface of the brightness enhancement film, respectively.

27. The method of claim 26, wherein a haze of the lower diffuser is substantially between 30% and 99.9%.

28. The method of claim 16, further comprising disposing an upper diffuser on the brightness enhancement film, so that one surface of the upper diffuser faces the fourth surface of the brightness enhancement film.

29. The method of claim 16, further comprising disposing a dual brightness enhancement film-diffuse on the brightness enhancement film, so that one surface of the dual brightness enhancement film-diffuse faces the fourth surface of the brightness enhancement film.

* * * * *